H. PETTIT.
LINT COTTON TREATING MACHINE.
APPLICATION FILED SEPT. 8, 1920.

1,401,439.

Patented Dec. 27, 1921.
2 SHEETS—SHEET 1.

Witness
Edwin L. Bradford

Inventor
Hugh Pettit,
by
his Attorneys

H. PETTIT.
LINT COTTON TREATING MACHINE.
APPLICATION FILED SEPT. 8, 1920.
1,401,439.
Patented Dec. 27, 1921.
2 SHEETS—SHEET 2.
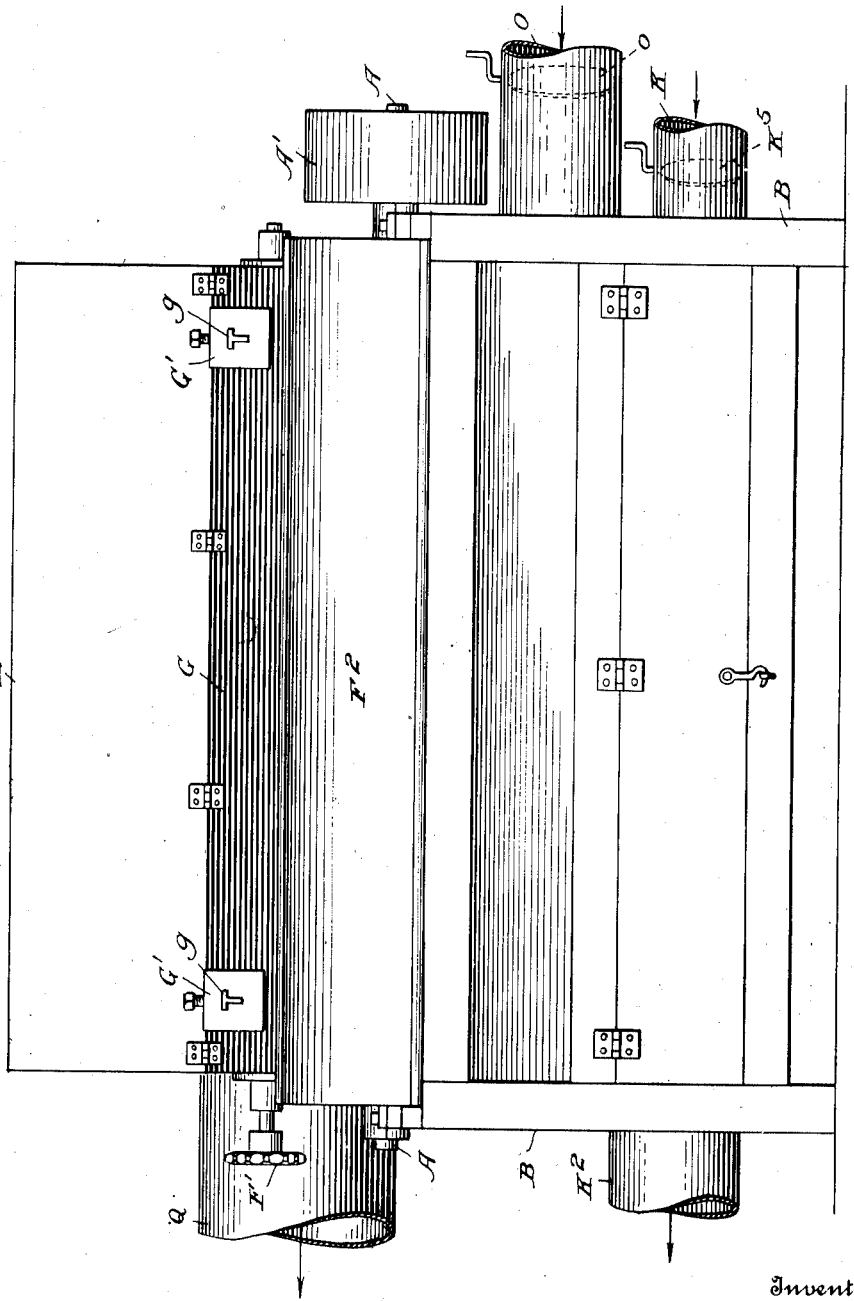
Witness
Edwin L. Bradford
Inventor
Hugh Pettit
By
his Attorneys

UNITED STATES PATENT OFFICE.

HUGH PETTIT, OF MEMPHIS, TENNESSEE.

LINT-COTTON-TREATING MACHINE.

1,401,439. Specification of Letters Patent. Patented Dec. 27, 1921.

Application filed September 8, 1920. Serial No. 408,834.

*To all whom it may concern:*

Be it known that I, HUGH PETTIT, a citizen of the United States, residing at Memphis, in the county of Shelby and State of Tennessee, have invented certain new and useful Improvements in Lint-Cotton-Treating Machines; and I do hereby declare the following to be a full, clear and exact description of the same, reference being had to the accompanying drawings, forming part of this specification.

This invention relates primarily to machines for reginning lint cotton, the objects of the invention being to provide a machine which will permit of the profitable handling of this class of cotton whereby the grade is sufficiently improved to offset the cost of reginning and the loss in weight due thereto. The machine adopted for illustrating the present improvements is one which is commonly called a "regin," inasmuch as it is not adapted for handling seed cotton, but is adapted to handle cotton that has already been ginned and freed from seed.

The invention consists in certain improved arrangements and combinations of parts including means whereby the final cleaning of the lint cotton is effected by a regulatable air blast and whereby the cleaned cotton is removed from the cylinder of gin saws by a separate regulatable air blast, together with certain novel details of construction and combinations and arrangements of parts, all as will be hereinafter described and pointed out particularly in the appended claims.

Referring to the accompanying drawings,—

Fig. 2 is a front elevation of the machine shown in Fig. 1, with the conveyer conduits leading to and from the machine broken away.

Figure 1:
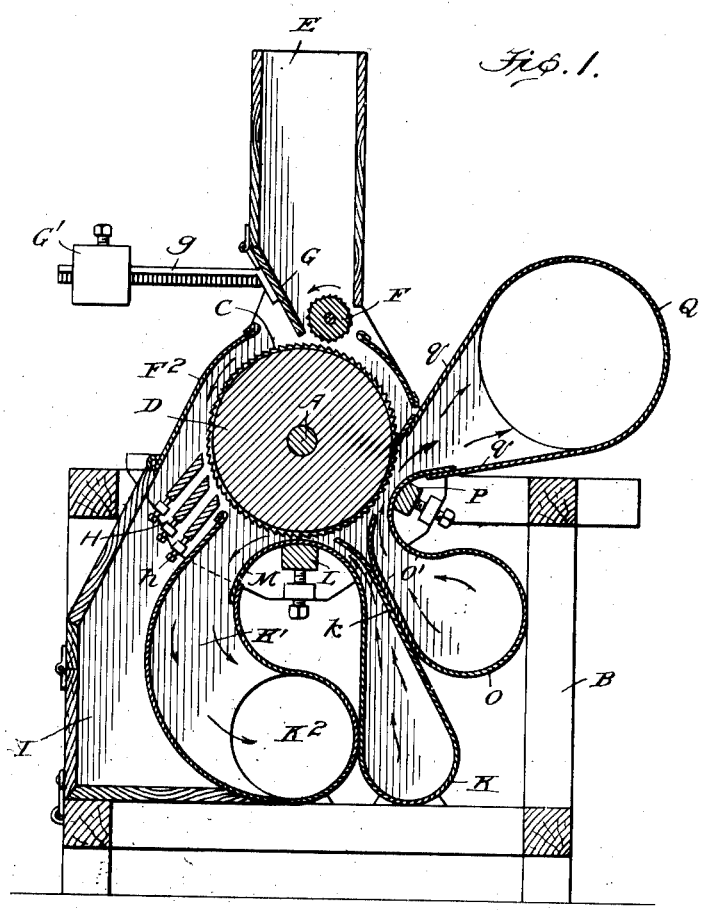
Figure 1 is a section in a vertical plane, through a lint cotton treating machine embodying the present improvements.
Figure 3:
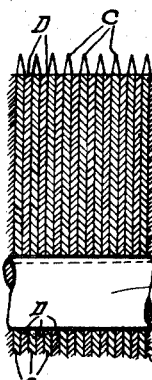
Fig. 3 is a detail view of a portion of the saw cylinder shown in cross section.

The machine embodies a cylinder of gin saws arranged on a common shaft A journaled in suitable bearings in a frame B having the common characteristics of a cotton gin frame, said saw cylinder being adapted to be driven from any suitable source of power, through a pulley A'. The individual saws C are preferably rather closely spaced and are separated by distance pieces or disks D of such diameter that the peripheries of the disks will be substantially at the base line of the teeth, whereby certain advantages to be hereinafter pointed out are secured. Above the saw cylinder there is arranged a hopper E for the reception of the lint cotton, and in the base of this hopper in proximity to the saw cylinder there is a feed roll F adapted to be rotated by a sprocket wheel F' deriving its motion from any suitable source. The speed of rotation of the feed roll F is relatively slow. Opposed to the feed roll is a swinging pressure board or gate G held advanced by an adjustable weight G' mounted on a substantially horizontal arm $g$ connected with the gate G, said gate being adapted to advance into proximity to the feed roll under the influence of the weight and to hold a constant tension on the cotton, whereby the saws C will be prevented from jerking out wads of cotton, and each saw tooth will be enabled to draw out an equal amount, whereby an even and uniform feed is secured.

A cover $F^2$ extends partly around the upper quadrant of the cylinder of saws forming a channel through which the cotton is carried by the rapid movement of the saws, and in this said channel, preferably below the level of the horizontal centers of the saws, there is located a plurality of grid bars H adapted to be individually adjusted by screws $h$, said bars constituting what might be termed a series of whipping boards against the edges of which trash held by the cotton and not thrown off by the centrifugal action into the channel, will strike and be combed off, thereby finding its way into the channel and down into the trash box I, near the base of the machine.

For the purpose of removing all of the remaining trash, dirt, dust, moisture, etc., the cotton held by the saw teeth, after passing the grid bars H, is subjected to an air blast which is so directed and regulated that while the lint cotton itself will be held firmly in place against the saw teeth, the dirt, etc., will be effectually removed therefrom. As a convenient and preferred arrangement, this cleaning action is effected at the bottom of the cylinder and the air blast which enters through a suitable duct K is directed by a nozzle having converging walls $k$ against the bottom of the cylinder of saws in a tangential direction, reversely to the direction of rotation and escapes immediately into a relatively large discharge chamber or channel K', thence, into a duct K² which is adapted to carry away the dirt to any suitable point of deposit. The blast of air which is supplied to the duct K is preferably regulated by any suitable means such, for example, as by the blower itself, or through a damper arrangement conventionally indicated at K⁵, and in addition its intensity is regulated accurately at the point where it coöperates with the saw cylinder and cotton carried thereby through the medium of an adjustable bar L, which bears on the outer side of the curved wall M of the nozzle k. This curved wall is made to yield or adjust in connection with the bar L directly toward and from the surface of the cylinder of saws so as to form a constricted passage to confine the air and adjust the intensity of the blast at this point, which blast, however, always proceeds in a direction directly opposite to that of the movement of the saws and cotton carried thereby. This effect, it will be noted, is enhanced by the fact that the spaces or distance pieces between the saws prevent the formation of any channels or air spaces behind or below the teeth and, consequently, the air under pressure does not pass in behind the cotton and tend to carry the dirt into more intimate contact at some other point, but, on the contrary, it is directed in such wise as to carry the dirt out and away from the saws. By expanding into a relatively large discharge chamber the intensity of the blast is almost immediately reduced to a point where it will not carry the lint cotton off, inasmuch as the inertia of the cotton will retain it in place against any outward movement of the air in the discharge chamber.

The cleaned cotton passing through the point of greatest intensity of the blast travels forwardly with the saw-teeth and passes into a zone of air movement which is in the same direction as that of the movement of the saw teeth, but traveling at a much higher velocity. The arrangement for accomplishing this result is preferably one in which an air blast is derived through a duct O adapted to be regulated in any suitable way, illustrated conventionally by a damper o, and having an intensifying nozzle formed by walls O', one of which is adjustable toward and from the surface of the cylinder of saws through the medium of the adjustable bar P to form a constricted passage. The blast is directed by the nozzle in a direction tangential to the surface of the cylinder of saws, and into a chamber formed by diverging walls q forming the entrance to a cotton discharge duct Q. The walls q of the chamber are so arranged that they will receive the blast from the nozzle O' practically in a direct line, and by adjusting the bar P, the size of the passage and intensity of the blast may be so regulated as to remove the last vestige of lint cotton from the saw teeth, leaving the saw cylinder clean and ready to coöperate with the cotton at the feeding point.

It will be noted that the volume and intensity of the air currents at the cleaning and the discharging points may be separately regulated so as to secure maximum efficiency, and with the arrangement shown there are no ribs or other fixed parts projecting in between the saws, with the result that there is a minimum breakage of the cotton fiber, and consequently not only is the grade improved, but loss is materially reduced.

The machine as a whole is of exceedingly simple construction, the wearing parts are reduced to a minimum and the action is practically automatic after the air blasts have been regulated for operation upon fiber of a particular character or in a particular condition. The cotton is delivered thoroughly dried and free from trash, dirt or dust of any character.

What is claimed is:

1. In a cotton treating machine, the combination of a saw cylinder having the spaces filled to substantially the base of the teeth, means for feeding cotton to said cylinder, an air blast nozzle directed against said cylinder in a direction opposite the direction of rotation of the teeth for holding the cotton on the teeth and freeing it from dirt, etc., a second air blast nozzle directed against said cylinder in the direction of rotation of the teeth and at a higher velocity than that of the teeth for discharging the cotton therefrom, and means for creating a blast of air through said nozzles and for regulating its volume and intensity.

2. In a cotton treating machine, the combination of a saw cylinder having the spaces filled to substantially the base of the teeth, means for feeding cotton to the upper part of the cylinder, a constricted air passage formed by an adjustable wall at the bottom of the cylinder, a dirt exit with which said passage communicates and through which the teeth pass before reaching the constricted passage, a nozzle positioned to direct an air blast through said passage in opposition to the passage of the teeth therethrough, a second restricted passage through which the teeth pass, and a nozzle positioned to direct an air blast therethrough in the same direction as and at higher velocity than the movement of the teeth, and means for supplying regulated volumes of air under pressure to said nozzles.

3. In a cotton treating machine, the combination of a saw cylinder having the spaces between the saws closed at substantially the bases of the teeth, means for feeding cotton to said cylinder, adjustable grid bars projecting in proximity to the cylinder, an air and dirt discharge chamber through which the teeth travel after passing said bars, a constricted air passage leading to said chamber and through which the teeth pass, means for directing a blast of air through said passage reversely to the movement of the teeth, a second restricted passage through which the teeth pass, means for directing a blast of air through the latter passage in the direction in which the teeth travel, a cotton and air discharge communicating with the latter passage, and means for regulating the volume and intensity of the blasts passing through said passages.

4. In a cotton treating machine, the combination of a saw cylinder, and means for feeding cotton thereto, in combination with means for cleaning and discharging the cotton from said cylinder, comprising air passages through which the saw teeth pass successively, said passages being formed by curved walls adjustable toward and from the cylinder, and means for directing air blasts through said passages in opposite directions, the blast through the passage first reached by the teeth being in opposition to the movement of the teeth.

5. A cotton treating machine comprising a saw cylinder, means for feeding cotton thereto and for removing trash discharged by centrifugal force, a relatively large air and dirt discharge chamber through which the saw teeth travel, a constricted passage leading to said chamber and through which the teeth travel in leaving said chamber, means for forcing a blast of air through said passage in opposition to the movement of the teeth, a second constricted passage through which the teeth pass after leaving the first passage, means for forcing a blast of air through the latter passage in the direction in which the teeth travel, and a tangentially arranged receiving chamber for the latter blast and cotton removed thereby from the teeth.

HUGH PETTIT.